Sept. 19, 1933.  P. A. BRICK  1,927,679
ROAD GRADER
Filed June 16, 1931  2 Sheets-Sheet 1
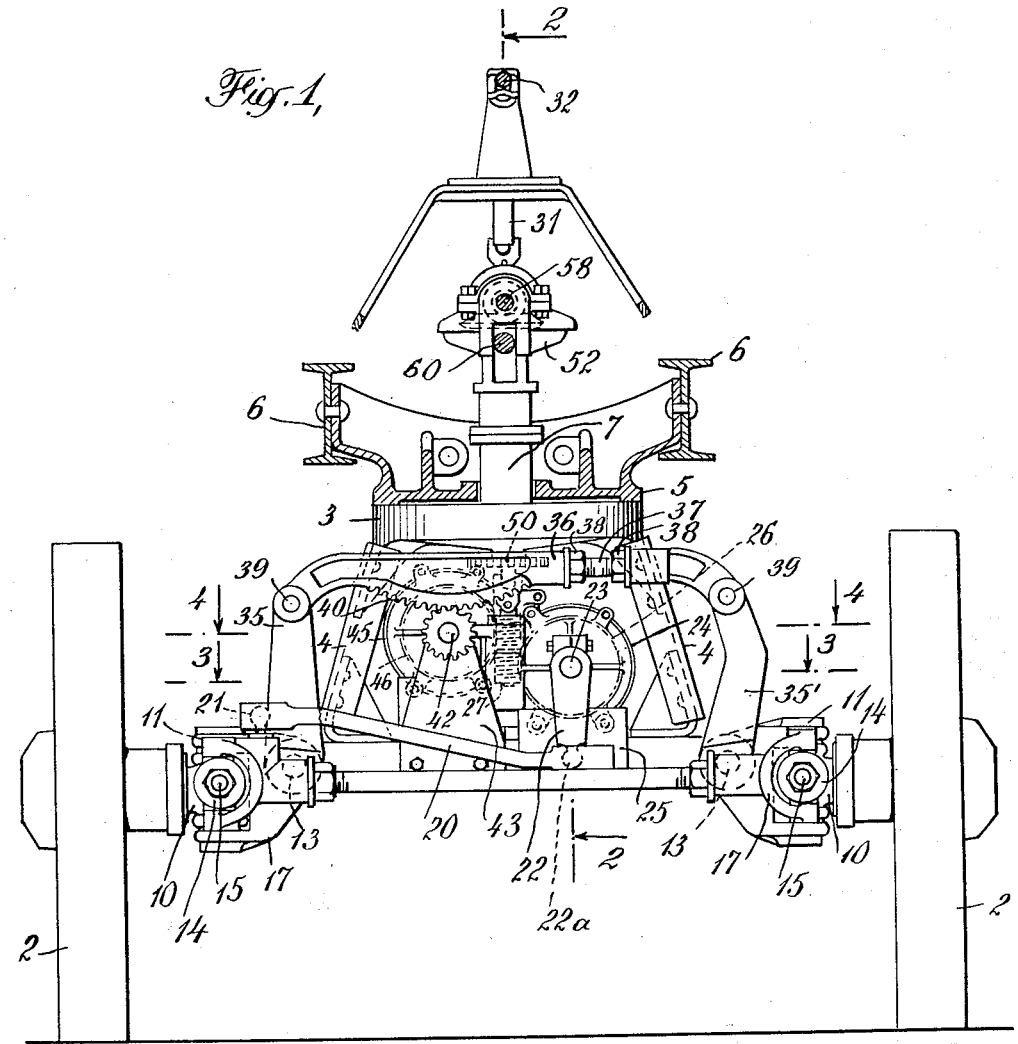
Fig. 1,
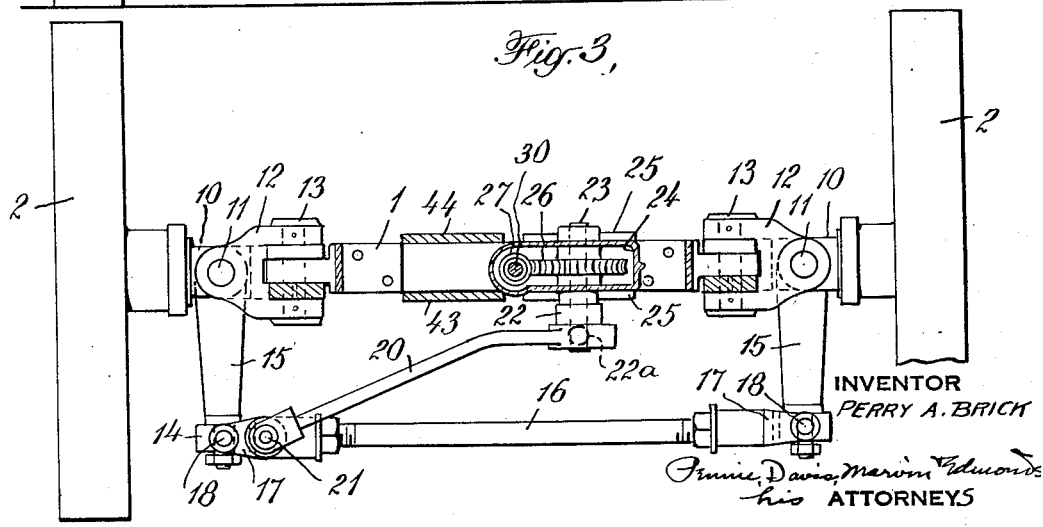
Fig. 3,
INVENTOR
PERRY A. BRICK
his ATTORNEYS

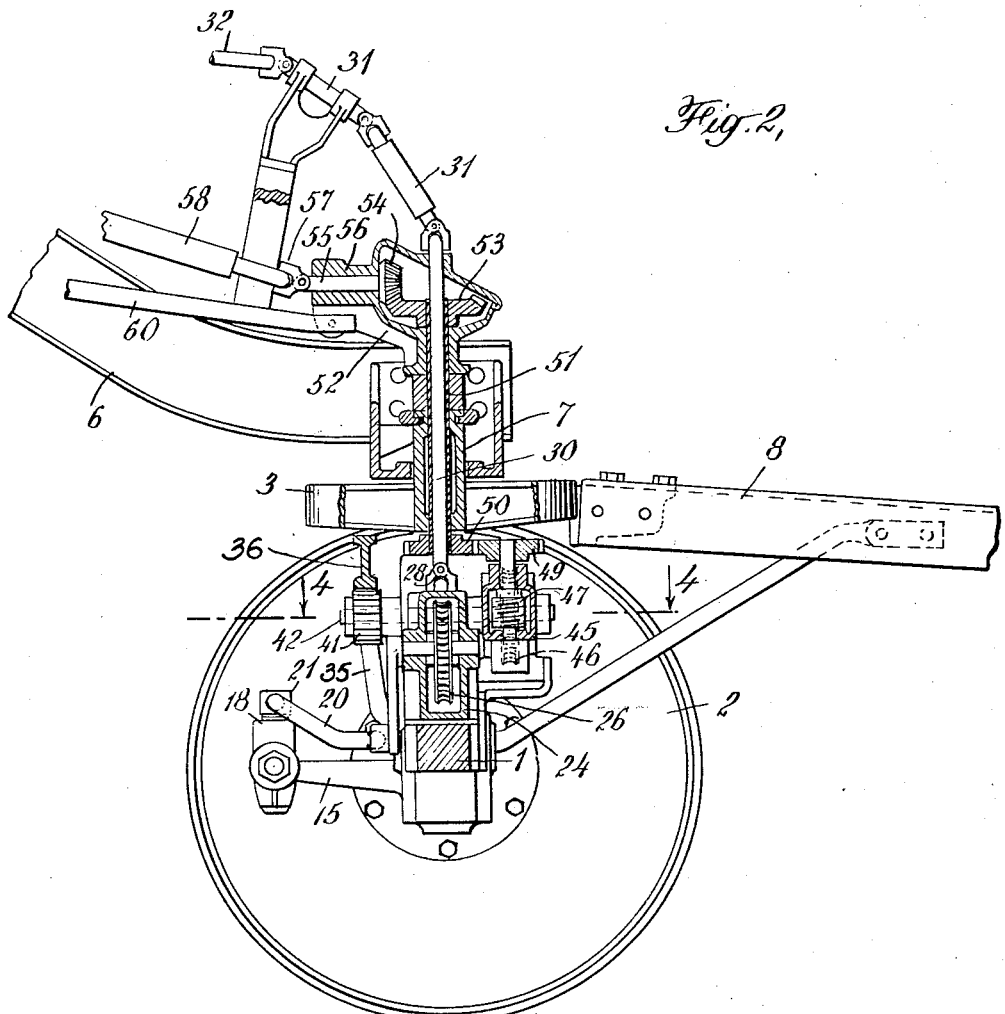
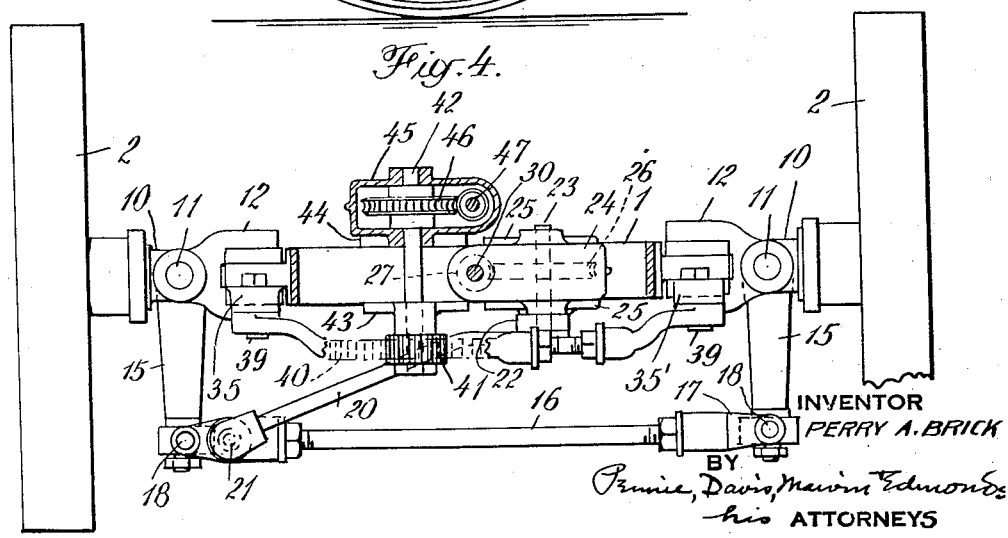

Patented Sept. 19, 1933

1,927,679

UNITED STATES PATENT OFFICE 1,927,679

ROAD GRADER

Perry A. Brick, Rome, N. Y., assignor to Revere Copper & Brass Incorporated, a corporation of Maryland Application June 16, 1931. Serial No. 544,858

7 Claims. (Cl. 37—157)

This invention relates to road graders, and more particularly to improvements in a front axle assembly which permits swinging the front wheels of the grader about both horizontal and vertical axes.

In a well-known type of grading machine the frame, comprising a pair of I-beams, is supported at its ends upon wheels so that the machine may be drawn over the ground by either a horse or a tractor hitched to its front end. Suspended from the frame intermediate its length and located at a position near the ground level is a mold board disposed at an angle to the direction of travel of the machine so that as the grader is drawn along the slanting mold board encounters the soft dirt and spreads it out crosswise of the road. The horse or tractor exerts draft through a tongue connected with the front axle which is free to turn beneath a bolster carrying the forward end of the machine, the direction in which the horse or tractor is guided determining, in general, the path of the machine. This mode of controlling the machine however is not entirely satisfactory, since because of the inherently awkward and unweildly nature of the machine, it is unable to execute quick, sharp turns which are often desirable under actual working conditions. Furthermore, the tendency for the machine to creep sideways owing to the side thrust imparted by the dirt to the slanting mold board ordinarily cannot be corrected by guiding the path of the horse or tractor.

The present invention has for its object the provision of a front axle assembly for road grading machines incorporating mechanism for rocking the front wheels about independent vertical axes to execute sharp turns and for turning the wheels of the vehicle at a slight angle to the proposed direction of travel to compensate for lateral shifting of the machine due to the side thrust imparted to the mold board.

Again, the ground over which the grader is drawn is often hilly so that when the vehicle travels along the sides of a slope there is a tendency for it to tip over. For this reason the wheels of grading machines are not infrequently arranged so as to permit them to be tilted or leaned with respect to the axle under the manual control of the operator, whereby to maintain them in approximately vertical planes regardless of the slant assumed by the axle. The invention therefore as an additional object contemplates the provision of improved mechanism for rocking the wheels in unison about horizontal axes whereby this tipping tendency is counteracted.

A better understanding of the invention will be obtained by reference to the attached drawings, illustrating a preferred embodiment, in which: Figure 1 is an elevation of the front axle assembly viewed in a vertical plane just behind the front wheels of the grader and looking toward its forward end; Figure 2 is a vertical section through the front axle assembly on the line 2—2 of Fig. 1; Figure 3 is a horizontal section taken on the line 3—3 of Fig. 1; and Figure 4 is a horizontal section taken on the line 4—4 of Figs. 1 and 2.

In the embodiment of the invention shown in the drawings the front axle assembly of the grading machine consists in general of a main axle 1, of square or rectangular cross-section, with which at its ends are associated wheels 2. A fifth wheel 3 is supported upon a pair of brackets 4 rigidly fastened to the axle, this fifth wheel providing a bearing surface for a bolster 5 which supports the forward end of the machine frame 6. A hollow king pin 7, integral with the fifth wheel, projects vertically up through a suitable opening in the bolster to thus maintain the fifth wheel in rotatable assembly with the bolster, the fifth wheel being free to rotate below the bolster about an axis coincident with the axis of the king pin in response to angular displacement of the tongue 8 through which draft is transmitted to the grading machine. The king pin is slidably mounted within the bolster to provide a floating motion between the bolster and axle. At each end of the axle is a stub axle 10, upon which is rotatably mounted one of the wheels 2. Each stub axle is pivoted upon a vertical pin 11 carried in a knuckle 12 forked to embrace an end of the main axle 1, this knuckle, in turn, being arranged to rotate about a horizontal or transverse pin 13 passing through an opening in the end of the main axle and through eyes in the forked end of the knuckle embracing the axle. By this construction the wheels 2 may be rocked about either the vertical pins 11 or about the horizontal pins 13.

In order to turn the wheels upon the pins 11 to steer the machine the following control mechanism is provided: Projecting from the stub axles 10 horizontally toward the rear of the machine are arms 15 and these arms are united by a cross-tie 16 extending between their ends and parallel to the main axle 1. The arms 15, integral with stub axle 10, each has a short section near its end which is round. Pivotally mounted on this round section is a collar 14. This collar is provided with a trunnion 18 at the top and a similar trunnion at the bottom, and pivotally mounted on these trunnions is a cross-tie end 17 fastened upon each end of the cross-tie 16. This construction provides for rotation in two planes about the point formed by the intersection of the center lines of arm 15, trunnions 18, and cross-tie 16 except that one of the cross-tie ends 17 is provided with a ball 21 to which is connected one end of a draglink 20 forming a ball-and-socket joint. The draglink is bent at its other end to extend parallel with and adjacent to the axle 1 where it is connected to a crank 22 through a ball-and-socket joint 22a.

The crank 22 is fixed on a stub shaft 23 journalled within a gear housing 24 which latter is supported by plates 25 fastened to the axle 1. Keyed to the stub shaft within the housing 24 is a worm-wheel 26 and this worm-wheel co-operates with a worm 27. The worm is rotatably mounted in housing 24 but is provided with a stem which protrudes above the housing and is there connected by a universal joint 28 to an operating rod 30. This operating rod extends vertically up through the interior of the hollow king pin 7 to a position above the frame at the forward end of the machine where it is united, through a chain of universally connected links 31, to a control shaft 32 leading to the rear of the machine adjacent the platform (not shown) occupied by the operator where it may be manually manipulated as by means of a handwheel.

The control mechanism by which the wheels may be tilted or leaned will now be described. Formed integrally with and projecting upward from the knuckles 12 upon opposite ends of the axle are arms 35 and 35' and the upper ends of these arms are connected by a tie rod 36. The tie rod lies in a vertical plane parallel to the axle 1 and is composed of two parts connected by a stud 37 oppositely threaded at its ends and receivable in sockets in the contiguous ends of the two separated parts of the tie rod; thus the tie rod may be adjusted as to length by turning the stud which may be retained in the desired position of adjustment by locking nuts 38. The tie rod is pivoted at its ends to the outer ends of the arms 35 and 35' by means of pins 39 so that by shifting the tie rod endwise the knuckles 12 will be rotated upon their pivot pins 13. The tie-rod upon its lower face is formed with an arcuate shaped rack 40, the center of curvature of this rack lying above the tie rod. Engaging with this rack is a gear 41, this gear being fixed upon a shaft 42 journalled within plates 43 and 44 fastened to the sides and extending up from the main axle 1. A worm wheel 46, enclosed within a housing 45, is keyed upon the shaft 42 and this worm wheel cooperates with a vertically disposed worm 47 mounted within the housing as shown in Fig. 4. The arcuate shape of the rack 40 just referred to permits the tie rod 36 to lower when shifted endwise while at the same time maintaining intermeshing of gear 41 with the rack.

The upper end of the worm 47 projects above the top of the housing 45 and has keyed thereto a pinion 49 which engages a similar pinion 50 fastened to the lower end of a tubular shaft 51 surrounding the rod 30. The tubular shaft extends entirely through and projects above the hollow king pin 7 and has fixed upon its upper end a bevel gear 53. The projecting end of the tubular shaft is enclosed within a housing comprising a hollow casting 52 located above the upper end of king pin 7. A complementary bevel gear 54, engaging the bevel gear 53, is fastened upon a short horizontal shaft 55 journalled within a bearing 56 in the casting 52, both bevel gears being enclosed within the housing of casting 52. The horizontal shaft 55 is connected through a universal joint 57 to a control rod 58 leading rearwardly of the machine to a position adjacent the operator's platform. It should be noted that the fifth wheel, and with it the rest of the front axle assembly including the axle 1 and the wheels 2, is free to swing with respect to the bolster 5 about an axis extending centrally through the king pin 7. But since the axis of king pin 7 corresponds with the axes of the operating rod 30 and its surrounding tubular shaft 51, regardless of the position assumed by the fifth wheel, the steering mechanism and the wheel leaning mechanism are freely operable in any position of the axle, and the operation of one in any position does not interfere with the operation of the other. A torque rod 60 pivotally connected to casting 52 has its rear end extended through a hole (not shown) in a frame crosspiece, the hole being sufficiently large to permit the rod a certain degree of angular movement in all directions with respect to the hole and also to permit it to slide longitudinally therethrough. This rod acts to prevent rotation of the casting 52.

In operation the grading machine is drawn over the road to be graded by means of a horse or a tractor hitched to the tongue 8. While any change in the path of travel of the horse or tractor will swing the tongue 8 so as to turn the axle 1 to effect a corresponding change in the direction of travel of the grading mechine, nevertheless by the present construction the operator is enabled to steer the machine with greater precision and to make sharp changes in direction as occasion requires which would not otherwise be possible. Or the wheels may be similarly adjusted to overcome the tendency of the machine to creep sidewise due to the lateral component thrust transmitted by the dirt encountered by the slanting mold board. In either event rotation, either to the right or to the left, of a handwheel located adjacent the operator's platform and fastened upon the shaft 32 causes the wheels 2 to be rocked to effect the desired adjustment. More specifically, by rotating the control shaft 32 motion is transmitted to the vertical rod 30, which through the universal connection 28, turns the worm 27 thus rotating the worm-wheel 26. Rotation of the worm-wheel rocks the crank 22 which exerts either a push or a pull upon the draglink 20, depending upon in which direction the shaft 32 is rotated. The draglink through its ball and socket connection 21 with the cross-tie 16 shifts the cross-tie endwise to swing the arms 15 about their vertical pivot pins 11 and to thus, in turn, simultaneously rock the stub axles 10 upon which are mounted the wheels 2.

When it is desired to lean or tilt the wheels into planes non-perpendicular to the axle 1 in order to adjust the vehicle to sloping surfaces and thus reduce its tipping tendency, the operator rotates the control rod 58 as by means of a hand wheel or crank located adjacent his platform thereby revolving the intermeshing bevel gears 54 and 53. The bevel gear 53, being connected to the tubular shaft 51, transmits motion through this tubular shaft to pinion 50 and through pinion 50 to pinion 49, connected with the worm 47. Worm 47 engages the wormwheel 46 mounted on the same shaft as gear 41 so that the latter gear engaging the rack 40 on tie rod 36 shifts the cross-tie endwise to rock the arms 35 and 35' which are rigidly connected to the knuckles 12 pivoted upon the horizontal pins 13.

Thus during travel of the grading machine, the operator, by manipulating the control rods 32 and 58, is able to swing the front wheels of the machine in unison about either vertical or horizontal axes to regulate its direction of travel or to lean the wheels to accommodate the machine to sloping ground. The ball-and-socket joints 21 and 22a previously mentioned perform the very special function of permitting the draglink 20 to accommodate itself to the different positions assumed by the cross-tie 16. Thus when the wheels 2 are swung in one direction about their horizontal pivots 13, the arms 15 and consequently the cross-tie 16 carried thereby are elevated, and when swung in the other direction the tie rod is lowered. Nor is this leaning movement of the wheels opposed by the connection by which the cross-tie ends 17 are assembled with the arms 15 since it is clear from the structure which has been described that the rounded ends of arms 15 will turn idly within the collar 14. In addition, when the crank 22 is operated the draglink 20 is rotated slightly about a horizontal axis intersecting the ball-and-socket connection 21. However, under any of these conditions the flexible ball-and-socket connections permits the draglink 20 to adjust itself to changes in the relative position of the parts.

I claim:

1. In road grading apparatus, a front end assembly combination comprising, a grader supporting frame, a main-axle pivotally mounted to rotate with respect to said frame, stub-axles connected to the ends of said main-axle by knuckles having horizontal and vertical axes, means for rotating said main-axle about its pivotal mounting, and independent means for rotating the stub-axles about their horizontal or vertical axes.

2. In road grading apparatus, a front end assembly combination comprising, a bearing bolster supporting a frame, a main-axle, a hollow kingpin associated with the bolster and with the main-axle to establish pivotal motion therebetween, stub-axles supporting wheels knuckle-joined to the ends of the main-axle, and concentric shafts within the kingpin adaptable to rotate the stub-axles about horizontal or vertical axes.

3. In road grading apparatus, the combination comprising a bearing bolster supporting a frame, a main-axle having a kingpin mounted thereon, said kingpin being slidably and rotatably mounted in said bolster to provide floating motion of said bolster with respect to said axle, means for mounting wheels on the ends of said axle adaptable to rotation about horizontal or vertical axes, and means associated with said kingpin for causing said wheels to rotate horizontally or vertically.

4. In road grading apparatus, a front end assembly combination comprising, a pivotally mounted main-axle rotatable under the influence of an associated tractor, stub-axles connected to the main-axle by knuckles to provide horizontal and vertical axles, and means for rotating the stub-axles about vertical or horizontal axes.

5. In road grading apparatus, a front end assembly combination comprising, a rotatable main-axle, stub-axles associated with the main-axle adaptable to horizontal and vertical rotation, a hollow kingpin forming the axis of rotation for the main-axle, concentric shafts mounted within the kingpin associated with the stub-axles to provide horizontal or vertical rotation thereof.

6. In road grading apparatus, a front end assembly combination comprising, a pivotally mounted main-axle rotatable under the influence of an associated tractor, and stub-axles attached to the main-axle by means of knuckles having vertical and horizontal axles, and means for rotating the stub-axles about vertical and horizontal axes.

7. In road grading apparatus, a front end assembly combination comprising a main-axle rotatable under the influence of an associated tractor, a hollow kingpin forming the axis of rotation of the main-axle, stub-axles attached to the main-axle by means of knuckles providing horizontal and vertical axles, an inner shaft within the hollow kingpin associated with the stub-axles to rotate them about vertical axes, and a hollow shaft concentric with the inner shaft associated with the stub axles to rotate them about horizontal axes.

PERRY A. BRICK.